UNITED STATES PATENT OFFICE.

SIEGMUND FEITLER, OF LUDWIGSHAFEN, GERMANY.

METHOD OF PRESERVING ROASTED COFFEE.

SPECIFICATION forming part of Letters Patent No. 660,767, dated October 30, 1900.

Application filed June 28, 1900. Serial No. 21,919. (No specimens.)

*To all whom it may concern:*

Be it known that I, SIEGMUND FEITLER, a subject of the Emperor of Germany, residing at Ludwigshafen-on-the-Rhine, in the Kingdom of Bavaria, Germany, have invented certain new and useful Improvements in the Preservation of Roasted Coffee, of which the following is a specification.

My invention consists in a process for preserving fresh roasted coffee, the purpose being to preserve the aroma of the coffee and to keep the individual beans excluded from the air in such a manner that moisture—the most destructive agent of all for the beans—cannot reach the substance of the bean.

My process may be carried out not only with freshly-roasted coffee, but also by employing coffee which has been roasted for some time. This latter is resorted to only when the coffee is to be prepared for long shipments in sacks, especially so as to keep the moisture from entering the beans from the outside.

My process consists in coating each individual roasted coffee-bean with a substance that satisfies the following conditions: The coating must coherently surround the bean and be evenly distributed over its whole surface. It must be transparent, so that the quality of the coated bean may be determined and that the purchaser may not be deceived in this respect. The coating, for reasons which do not require special logical development, must also be tasteless and, above all, must be insoluble in water and in the digestive juices of the stomach, so that it does not enter the boiling water when the coffee is made, or should small particles of the coating be washed along by it, and thus come into the stomach, it does not dissolve in the digestive juices.

My process consists in the following: The coffee is roasted to the desired color, as usual, and then a resin is added and mixed with the coffee by lively stirring, the resin being preferably in the form of a coarse grain or of small pieces.

In choosing the resin the following points must be kept in mind: First, of course only such resins can be used which melt below the roasting temperature of the coffee. A further condition is that the resins do not decompose, creating evil tasting or smelling products, at the temperature at which they are used. If the coffee has a temperature at which the resin would eventually decompose, the coffee must of course be cooled to a lower temperature. The temperature at which the coating should take place depends on the melting-point of the resin. The roasting temperature of the coffee, as we are taught by experience, is between 170° and 200° It follows from these conditions for a good coating of the bean that only such resins can be used which leave a tasteless coating, at least after heating to the coating temperature.

A special form of my invention is shown in the following. As the same is developed under the use of shellac, respectively its different mercantile variants, (pomegranate shellac, blood shellac, chocolate shellac,) the process in this case is carried out as follows: The coffee is roasted, according to the desired color, at a high or low temperature and then, either in the roasting apparatus itself or in a special drum, cooled to the temperature at which the shellac, now added, melts to an evenly-flowing fluid, but at which it does not decompose. The temperature when shellac is used rests, preferably, between 100° and 130° centigrade. If the shellac, for instance, is added at the usual roasting temperature of 170° to 200°, it would be easily seen that the resin furnishes no viscid coating, but leaves the bean dull. I will not attempt to explain why, but probably the explanation lies in the fact that the resin has already decomposed. This is shown from the slightly-burned taste and that the products of the decomposition are no longer capable of forming a coating. After the coffee has been agitated for a few minutes with the added resin in the mixing apparatus it is spread on a cooling-sieve and cooled as quickly as possible. The coffee so treated fulfils with reference to its coating the conditions named in the beginning of this specification, as the coating is absolutely airtight, and thus neither permits the aroma of the coffee to escape nor the moisture in the air to enter. In this manner coffee so prepared may be shipped on transoceanic voyages packed in ordinary sacks and the like, which was formerly impossible.

I know that many attempts to produce a similar effect have been made, but in quite a different manner. Till now no one has succeeded in obtaining the results which I have obtained. Thus they have tried to dissolve resin in alcohol in order to use the solution to preserve grain; but such a process is not practicable for the reason, *inter alia*, that the addition of an alcohol solution in a hot roaster invariably causes an explosion or would be very dangerous; but also for hygienic reasons such a process is not useful, as the etheric oils in the coffee would be decomposed by the alcohol. The coffee would be deprived of its properties and become unwholesome. It has also been attempted to add dry resin to the coffee to conserve it; but this has never given any results. Nor has any one yet found a process to make this principle operative. It has been suggested to sprinkle finely-pulverized shellac or rosin on the coffee before beginning the roasting process, so that the pores of the coffee shall be closed. Then the coffee, together with the rosin, is roasted. Such a treatment of the coffee would not preserve it at all, but only deteriorate it. It is well known that the roasting temperature of coffee is between 170° and 200° centigrade and even as high as 240° centigrade, according to the quality of the coffee. The melting-point of the shellac lies between 90° and 100° centigrade and that of rosin between 130° and 140° centigrade. Should it be attempted to follow out the above suggestion of treating the coffee with pulverized shellac or rosin before roasting, and so close the pores of the coffee, the coffee would doubtlessly be deteriorated, as the shellac would totally decompose at the coffee-roasting temperature, 170° to 200° centigrade, leaving behind an evil-tasting residue. The same is the case if the coffee and the resin, which is to conserve it, are exposed simultaneously to the roasting temperature. Not only, however, does such a treatment of the coffee carry with it these disadvantages, but by this treatment the harmful materials contained in the coffee are prevented from leaving, which is really the object of the roasting. As to the use of rosin, it is known that rosin is always sticky. Therefore it is impossible to use ordinary rosin for my purposes. From all these circumstances it appears clearly that my process achieves decidedly new and other and better results than all those known. By my process the coffee is really inclosed by the coating air-tight from the atmosphere, the delicious aroma of the coffee is preserved, and the coffee can be stored for months without suffering either in its quality as a commercial and merchantable article or in its value as a stimulating food.

Having described my invention, what I claim, and desire to secure by Letters Patent, is—

1. The process of coating coffee with tasteless, insoluble and transparent resin coating which consists in roasting the coffee, lowering the temperature thereof and adding the resinous substance to the coffee in a dry condition, at that temperature at which the resin melts equally but does not decompose, so as to efficiently coat the coffee, and then cooling the coffee.

2. The herein-described process of coating coffee, which consists in roasting the coffee at a suitable roasting temperature and thereupon coating the said coffee with a resinous substance in a dry state while the coffee is at a temperature of between 100° and 130° centigrade and then cooling the coffee.

3. The process of coating coffee with a resinous substance, which consists in roasting the coffee and then coating the same with a resinous substance while at a temperature between the melting and decomposing temperature of the resinous substance.

SIEGMUND FEITLER.

Witnesses:
O. WENDELMUTH,
JACOB ADRIAN.